(12) United States Patent
Horgan

(10) Patent No.: US 6,412,212 B1
(45) Date of Patent: Jul. 2, 2002

(54) ICE FISHING NET ASSEMBLY

(76) Inventor: Timothy D. Horgan, 252 Yellow Pine Dr., Bailey, CO (US) 80421

( * ) Notice: Subject to any disclaimer, the term of this patent is extended or adjusted under 35 U.S.C. 154(b) by 0 days.

(21) Appl. No.: 09/630,710

(22) Filed: Aug. 3, 2000

(51) Int. Cl.[7] .............................................. A01K 77/00
(52) U.S. Cl. ........................................................ 43/11
(58) Field of Search .................. 43/7, 11, 12; D22/135; 210/470

(56) References Cited

U.S. PATENT DOCUMENTS

| | | | | |
|---|---|---|---|---|
| 899,724 A | * | 9/1908 | Golden | ........................ 210/470 |
| 2,556,650 A | * | 6/1951 | Hicks | ............................. 43/12 |
| 3,099,888 A | * | 8/1963 | Jaster | ............................. 43/12 |
| 3,318,035 A | * | 5/1967 | Hovland | ......................... 43/12 |
| 4,446,646 A | * | 5/1984 | Van't Veld | ..................... 43/12 |
| 4,769,939 A | | 9/1988 | Gonska et al. | |
| 4,866,872 A | | 9/1989 | Guilbault et al. | |
| 5,140,767 A | | 8/1992 | Traut | |
| 5,533,293 A | * | 7/1996 | Boehm | ........................... 43/12 |
| D381,781 S | * | 7/1997 | Clay | ......................... D22/135 |

* cited by examiner

Primary Examiner—Kurt Rowan
(74) Attorney, Agent, or Firm—Ancel W. Lewis, Jr.

(57) ABSTRACT

A net assembly includes a specially shaped double curved, elongated frame, a net on the frame, and an adjustable length handle attached to the rear end of the frame that is effective in inserting through a hole in the ice for retrieving a fish hooked on the end of a line.

11 Claims, 2 Drawing Sheets

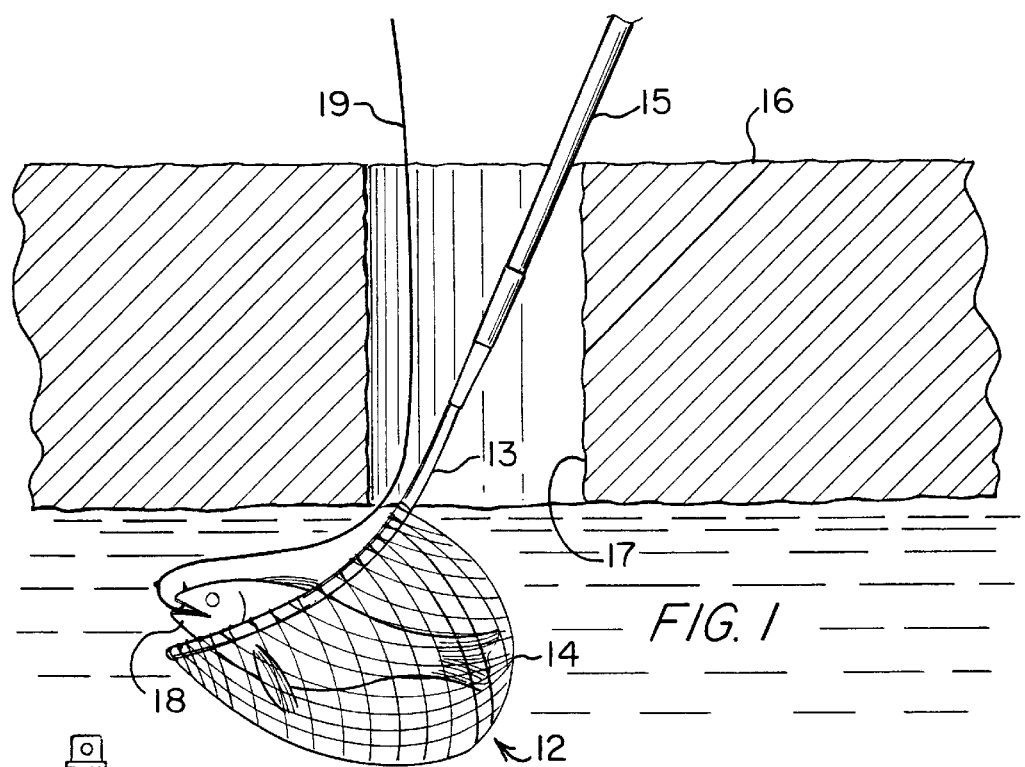
FIG. 1
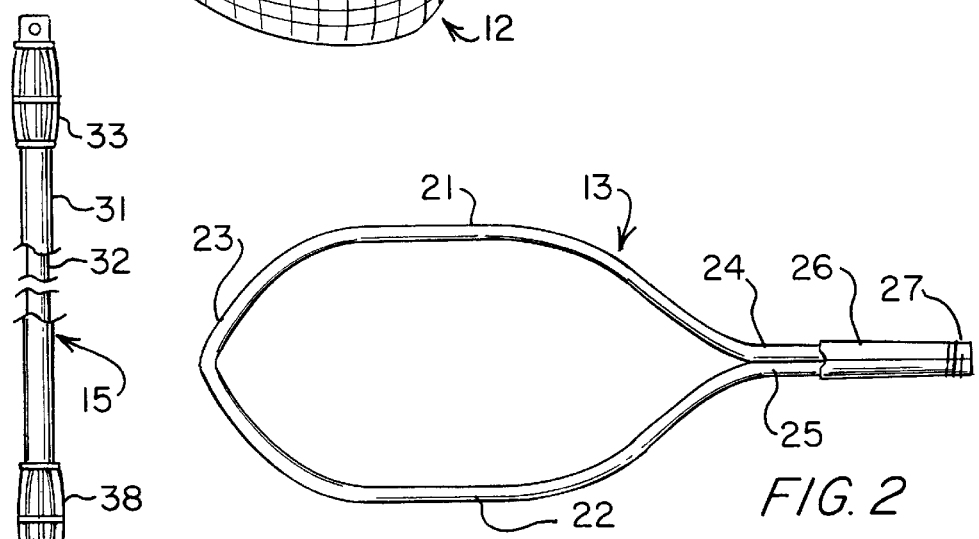
FIG. 2
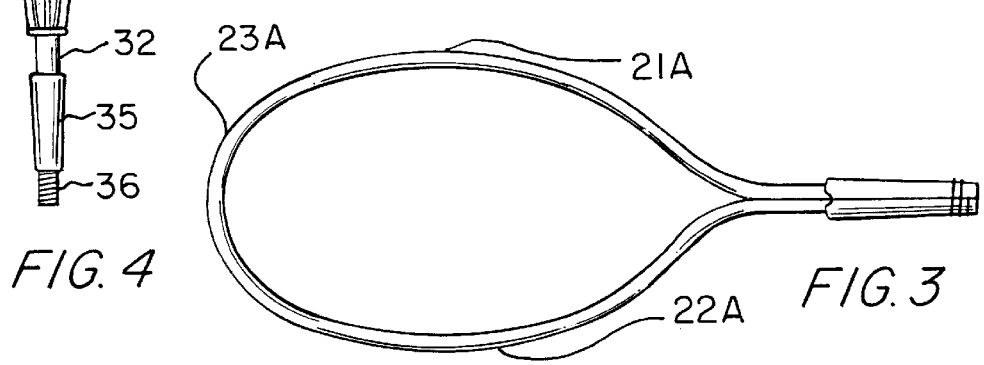
FIG. 4
FIG. 3

ICE FISHING NET ASSEMBLY

TECHNICAL FIELD

This invention relates to fishing nets and more particularly to a fishing net assembly that is especially suited for ice fishing.

BACKGROUND ART

A number of attempts have been made to provide an accessory for ice fishing that prevents the loss of the fish when pulled up through a hole in the ice. The previous prior known fishing nets have round, flat frames and are not easily inserted through a hole in the ice and manipulated to retrieve a fish on a line so fish are frequently lost.

U.S. Pat. Nos. 4,866,872 and 5,140,767 address this problem but utilize relatively complex mechanisms to retrieve fish on a line under the ice.

U.S. Pat. No. 4,769,939 discloses a scoop for ice fishing with an extensible handle.

DISCLOSURE OF THE INVENTION

In accordance with the present invention there is provided a net assembly including a double-curved frame carrying a net. The frame has a greater length than width and further has an elongated, generally oval-shaped profile as viewed from the top with a frame width less than the diameter of the hole in the ice to permit insertion through the hole. The frame also has a dished or bowed profile as viewed from the side. The frame has a pair of spaced, opposed outwardly bowed side portions, a front end portion and converging rear portions. The side portions are also downwardly bowed. The handle preferably is length adjustable for different ice thicknesses and water depths and is shown as made of telescoping outer and inner tubular sections. A coupling releasably fastens the handle to the rear end portions of the frame.

BRIEF DESCRIPTION OF THE DRAWINGS

Details of this invention are described in connection with the accompanying drawings which like parts bear similar reference numerals in which:

FIG. 1 is a side elevation view and cross section of the net shown below a layer of ice over water with a hole through the ice having the net shown in a fish retrieving position having the handle extending up through the hole.

FIG. 2 is a top plan view of the frame shown in FIG. 1.

FIG. 3 is a top plan view of an alternative shape of frame.

FIG. 4 is a side elevation view of the handle detached from the frame with portions broken away to show interior parts with the handle being shown in the fully retracted position so that it is of minimum length.

DETAILED DESCRIPTION

Figure 5:
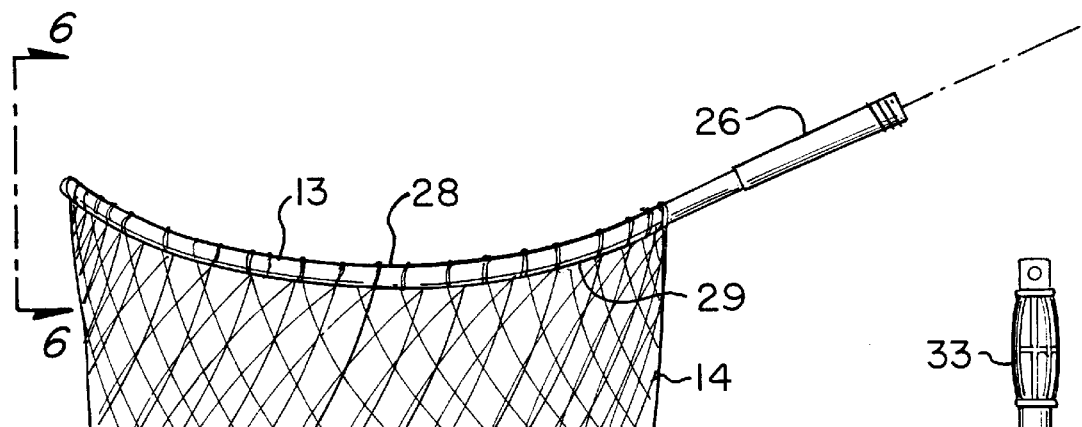
FIG. 5 is a side elevation view of the net assembly shown in FIG. 1 with the handle removed.
Figure 6:
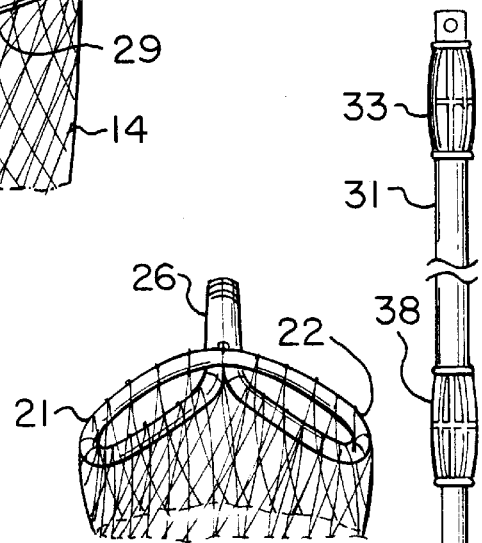
FIG. 6 is a front elevation view of the assembly shown in FIG. 1 taken along line 6—6 of FIG. 5.

Referring now to FIGS. 1, 2, 4 and 5 of the drawing there is shown an ice fishing net assembly 12 having a frame 13 carrying a net 14 with a handle 15 removably connected to the rear end of the frame 13. The net assembly 12 is shown in an operative position below a layer of ice 16 above water with the ice having a hole 17 and retrieving a fish 18 on a hook on a line 19.

The frame 13 is generally double curved having an elongated, generally oval-shaped profile as viewed from the top with a pair of spaced, opposed, generally convex side portions 21 and 22, a V-shaped front portion 23 and a pair of rear portions 24 and 25 with frame 13 preferably being made of a single piece of shaped metal tubing. The side portions 21 and 22 have curved end portions and a straight intermediate portion. The frame 13 somewhat resembles a hollow spoon and functions like a spoon in scooping a fish attached to a line.

A handle coupling member 26 is attached to the rear portions 24 and 25 and has an internally threaded end portion 27. The modified form shown in FIG. 3 has arcuate or continuously curved convex side portions 21A and 22A and a curved front end portion 23A. Frame 13 has a dished profile as viewed from the side. Each side portion has a concave top surface 28 and a convex bottom surface 29.

Figure 10:
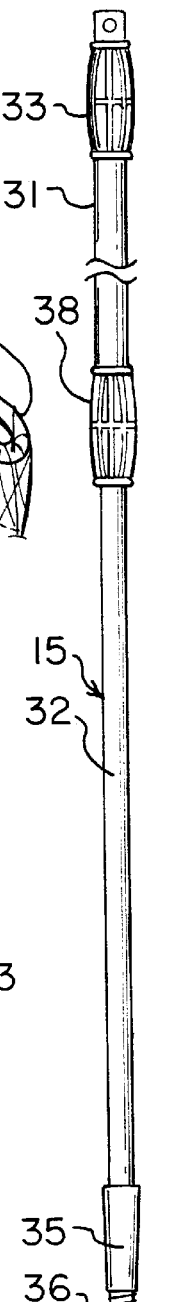
FIG. 10 is a side elevation view of the handle in the fully extended position so that it is of maximum length.

The handle 15 is shown detached from the frame 13 in a retracted position in FIG. 4 and a fully extended position in FIG. 10. The handle 15 is length adjustable having an outer tubular section 31 and an inner tubular section 32 telescoping in the outer tubing section 31. A grip 33 is provided at the rear of the outer tubular section 31. A coupling member 35 is attached to the front end of the inner tubular section 32 and has external threads 36 that thread into internal threads 37 on coupling member 26. A clamp down sleeve 38 fits over the telescoping sections and turns to lock the sections at a selected length position.

Figure 7:
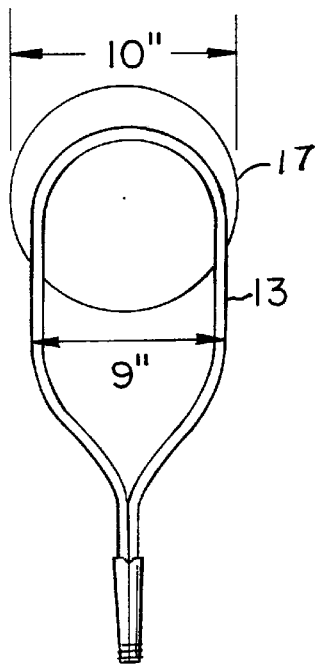
FIG. 7 is a top plan view of the nine inch frame associated with a ten inch hole.
Figure 8:
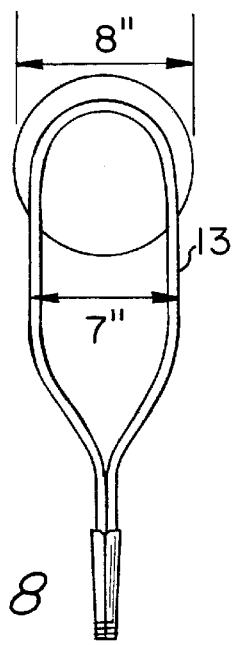
FIG. 8 is a top plan view of a seven inch frame associated with an eight inch hole.
Figure 9:
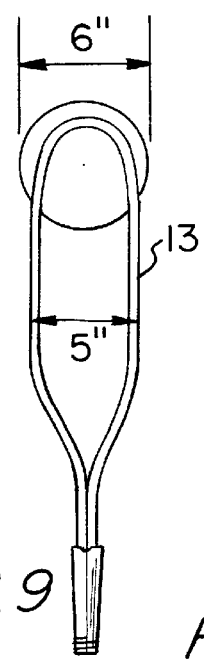
FIG. 9 is a top plan view of a five inch frame associated with a six inch hole.

By way of illustration and not limitation the length of the frame 13 is sixteen inches and the width nine inches as viewed from the top with the bow as viewed from the side being three inches. This provides a length to width ratio for the frame of about 16:9 and length to bow depth as viewed from the side of about 16:3. The length of the handle 15 in the retracted position in FIG. 4 is 36 inches and the length of the handle in the extended position shown in FIG. 10 is 84 inches providing a length adjusted range of 36 to 84. As shown in FIGS. 7–9 the net assemblies according to the present invention preferably will be provided as a set having frames of different widths that relate to the diameters of the different augers typically used to form holes in the ice of different sizes. FIG. 7 shows a ten inch hole and a nine inch frame, FIG. 8 shows a eight inch hole and a seven inch frame, and FIG. 9 shows a six inch hole and a five inch frame.

The elongated or oval shape with the double curvature allows the frame to function much like a spoon to dip under the fish as shown in FIG. 1 and has been found to be highly reliable in retrieving fish under the ice using a scooping action. The adjustable length handle facilitates use for different ice thicknesses and water depths.

Although the present invention has been described with a certain degree of particularity, it is understood that the present disclosure has been made by way of example and that changes in details of structure may be made without departing from the spirit thereof.

What is claimed is:

1. An ice fishing net assembly comprising:
   a double curved frame having a generally oval-shaped profile as viewed from the top with a pair of outwardly bowed, spaced, opposed side portions and a front end portion and a pair of opposed rear end portions, said frame having a dished profile as viewed from the side, the width of said side portions being sufficiently less than the diameter of the hole in the ice into which said frame is inserted to permit insertion through the hole and below the ice whereby the frame and a net on the frame with a handle attached to said frame is usable to retrieve a fish on a hook on a line under the ice via a hole in the ice, each said side portion having a downwardly concave top surface and a downwardly convex bottom surface, the length of the frame being substantially greater than the width of the frame to provide an elongated shape, said frame being made of a single piece of tubing, and said handle being length adjustable to permit placement of the frame and net to a selected depth below the hole in the ice.

2. The net assembly as set forth in claim 1 wherein the front portion is V-shaped and said side portions have curved end portions and a straight intermediate portion.

3. The net assembly as set forth in claim 1 wherein said front portion is arcuate and said side portions are continuously curved.

4. The net assembly as set forth in claim 1 wherein the ratio of length to width of said frame is about 16:9.

5. The net assembly as set forth in claim 1 wherein the depth of a bow of said frame as viewed from the side has a ratio to tie frame length of about 16:3.

6. The net assembly as set forth in claim 1 provided as a set wherein there are a plurality of frames of different widths each related to the diameter of different augers that form holes of different sizes in the ice.

7. The net assembly as set forth in claim 1 wherein said frame is made of shaped metal tubing.

8. The net assembly as set forth in claim 1 wherein said handle has a first coupling releasably attached to a second coupling at a rear end portion of said frame.

9. The net assembly as set forth in claim 8 wherein said handle is made of telescoping inner and outer tubular sections.

10. The net assembly as set forth in claim 1 wherein the width of the frame is about one inch less than the diameter of the hole in the ice.

11. An ice fishing net assembly comprising:

a double curved frame having a generally oval-shaped profile as viewed from the top with a pair of outwardly bowed, spaced, opposed side portions and a front end portion and a pair of opposed rear end portions, said frame having a dished profile as viewed from the side, the width of said side portions being less than the diameter of the hole in the ice into which said frame is inserted to permit insertion through the hole and below the ice whereby the frame and a net on the frame with a handle attached to said frame is usable to retrieve a fish on a hook on a line under the ice via a hole in the ice using a scooping action, each said side portion having a downwardly concave top surface and a downwardly convex bottom surface, the length of the frame being substantially greater than the width of the frame to provide an elongated shape, said frame being made of a single piece of shaped metal tubing, and said handle being length adjustable to permit placement of the frame and net to a selected depth below the hole in the ice, said handle having a first coupling releasably attached to a second coupling at a rear end portion of said frame.

\* \* \* \* \*